United States Patent [19]

Berg

[11] Patent Number: 4,472,603

[45] Date of Patent: Sep. 18, 1984

[54] PORTABLE COMMUNICATION APPARATUS

[76] Inventor: Arnold M. Berg, 933 Arnold Ave. North, Thief River Falls, Minn. 56701

[21] Appl. No.: 462,758

[22] Filed: Feb. 1, 1983

Related U.S. Application Data

[63] Continuation-in-part of Ser. No. 396,046, Jul. 7, 1982.

[51] Int. Cl.[3] .............................................. H04B 5/02

[52] U.S. Cl. ........................... 179/107 R; 179/182 R; 381/69

[58] Field of Search ............... 179/107 R, 182 R, 157, 179/156 R; 381/68, 69, 120, 122, 74, 77

[56] References Cited

U.S. PATENT DOCUMENTS

| | | | |
|---|---|---|---|
| Re. 23,203 | 3/1950 | Posen . | |
| 1,826,797 | 10/1931 | Leach et al. . | |
| 1,952,577 | 3/1934 | Bennett . | |
| 1,973,410 | 9/1934 | Greibach . | |
| 2,072,705 | 3/1937 | Bloomheart . | |
| 2,094,681 | 10/1937 | Sears | 179/107 R |
| 2,445,425 | 7/1948 | Gabbert | 179/107 R |
| 2,554,834 | 5/1951 | Lavery . | |
| 2,584,896 | 2/1952 | Maffris . | |
| 3,659,056 | 4/1972 | Morrison | 179/107 R |
| 3,668,334 | 6/1972 | Schwake . | |
| 3,742,359 | 6/1973 | Behymer | 179/107 R |
| 3,777,077 | 12/1973 | Johanson | 179/107 R |
| 4,291,203 | 9/1981 | Bellafiore . | |

*Primary Examiner*—G. Z. Rubinson
*Assistant Examiner*—L. Schroeder
*Attorney, Agent, or Firm*—Merchant, Gould, Smith, Edell, Welter, Schmidt

[57] ABSTRACT

A portable communication apparatus (10) for communication between a first person of normal hearing ability and a second person whose hearing is impaired is disclosed. The communication apparatus includes a first housing (12) enclosing a microphone and an amplifier, the first housing (12) being adaptable for being carried in a coat pocket or the like of the first person. The communication apparatus further includes a second housing (22) constructed and arranged to fit over the ear of the second person. The second housing (22) includes means for receiving electrical signals from the amplifier and converting the electrical signals into sound. An electrical connector (20) electrically connects the receiving means in the second housing (22) with the amplifier in the first housing (12) whereby the voice of the first person is amplified and transmitted to the receiving means in the second housing (22), thereby enabling the second person to hear the first person.

2 Claims, 4 Drawing Figures

PORTABLE COMMUNICATION APPARATUS

This application is a continuation-in-part of application Ser. No. 396,046 filed July 7, 1982.

TECHNICAL FIELD OF THE INVENTION

The present invention relates to a portable communication apparatus. More particularly, the present invention relates to a portable communication apparatus to be carried on the body of a first person having normal hearing for communicating with other second persons whose hearing is impaired.

BACKGROUND OF THE INVENTION

Hearing aids of the type to be worn on the body of the user are old in the art. An example of such is U.S. Pat. No. 2,482,288, issued Sept. 20, 1949 to Posen and subsequently reissued on Mar. 7, 1950 as Re. Pat. No. 23,203.

Posen discloses a portable hearing aid including a receiver or an earphone to be placed in the ear of the user and a housing, containing a microphone, amplifier and batteries, carried on the body of the user.

Posen is designed as a hearing aid for a single user to be carried on the body of the user and not as a communications device to be carried on the body of a first person of normal hearing for communication with a second person of impaired hearing. In Posen, the mocrophone is located on the side of the housing, as opposed to the top portion of the housing, which makes it difficult for the microphone to detect spoken words by the party wearing the device.

Additionally, other hearing aids have been developed for use by a person having impaired hearing. However, these devices typically undergo extensive miniaturization so as to conceal their presence on the body of the user. As a result these devices are relatively expensive due to the miniaturized components. Furthermore, these devices do not provide a practical communication apparatus which is carried on the body of a person of normal hearing for use with those having impaired hearing.

The present invention solves these and many other problems associated with the prior art.

SUMMARY OF THE PRESENT INVENTION

The present invention relates to a portable communication apparatus for communication between a first person of normal hearing ability and a second person whose hearing is impaired. The communication apparatus includes a first housing enclosing a microphone and an amplifier, the first housing adaptable for being carried in a coat pocket or the like of the first person. The first housing further defines a sound inlet in a top portion thereof. The microphone is positioned adjacent the sound inlet such that the first person is able to speak into the microphone through the sound inlet. The first housing also includes a power source for the microphone and amplifier circuitry. A switch for manually switching the communication apparatus on and off and controlling the volume thereof is positioned on the first housing. A second housing separate and distinct from the first housing is constructed and arranged to fit over the ear of the second person. The second housing includes means for receiving electrical signals from the amplifier and converting the electrical signals into sound. An electrical connector electrically connects the receiving means in the second housing with the amplifier in the first housing whereby the voice of the first person is amplified and transmitted to the receiving means in the second housing, thereby enabling the second person to hear the first person.

A particularly advantageous feature of the present invention is that it can be carried on the body, e.g., in a coat pocket, of a first person who is of normal hearing such that the first person can use the apparatus to communicate with others who are hard of hearing and who do not have hearing aids. The housing of the present invention can also be hand held by the first person while talking or placed on a relatively flat surface.

The earphone apparatus is separate from the housing containing the amplifier, microphone and batteries and is electrically connected thereto by an elongated electrical connector such that the earphone can be inserted into or placed over the ear of the hearing impaired person while the housing is carried on the body of the first person. Furthermore, the microphone is located in the top portion of the housing such that the first person will be talking generally into the microphone thereby enabling the microphone to detect very low speech levels. Consequently, a person can carry on a normal personal conversation with others who are hard of hearing even though they do not have their own hearing aids. The present invention has particular application in the medical field wherein medical doctors frequently have a need to talk with patients whose hearing is impaired. Another feature of one embodiment of the present invention is an adapter for releasably connecting the electrical connector to the housing such that the connector may be disconnected and the earphone carried separately from the amplifier housing.

In one embodiment of the present invention, a person is able to carry on a conversation simultaneously with two hearing impaired persons.

The present invention is economical to produce as it does not require significant miniaturization of the electrical components so as to reduce the size of the apparatus to a size wherein it is largely unnoticed on the body of the user. Conventional circuitry can thus be utilized to produce the pocket-sized apparatus.

Additionally, the present invention is relatively simple to operate, there being but a single control knob for switching the apparatus on and off and adjusting the volume thereof.

These and various other advantages and features of novelty which characterize the present invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter in which there is illustrated and described a preferred embodiment of the invention.

BRIEF DESCRIPTION OF THE DRAWINGS

In the drawings, in which like referenced numerals and letters indicate corresponding parts throughout the several views.

DETAILED DESCRIPTION OF THE PRESENT INVENTION

Figure 1:
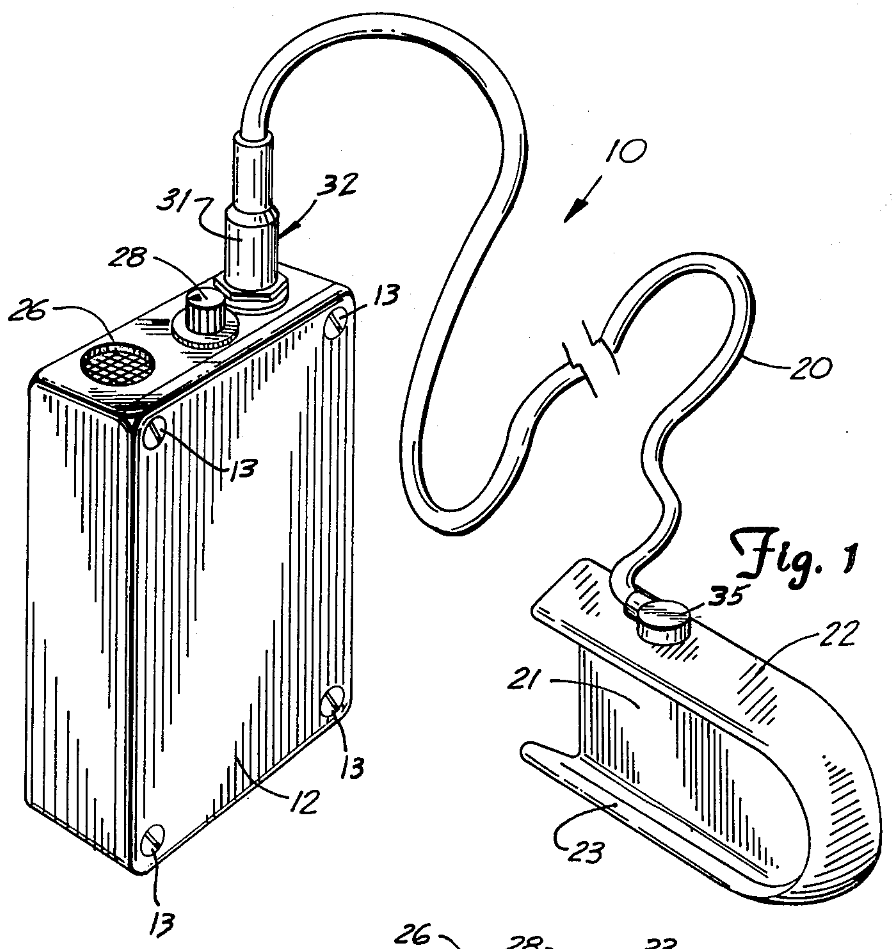
FIG. 1 is a view in perspective of the present invention.
Figure 2:
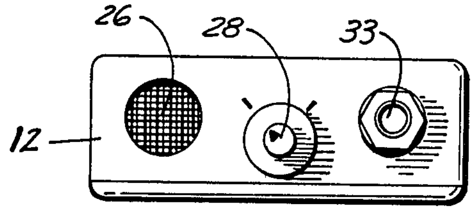
FIG. 2 is a top plan view of the housing containing the microphone and amplifier circuitry of the present invention.
Figure 3:
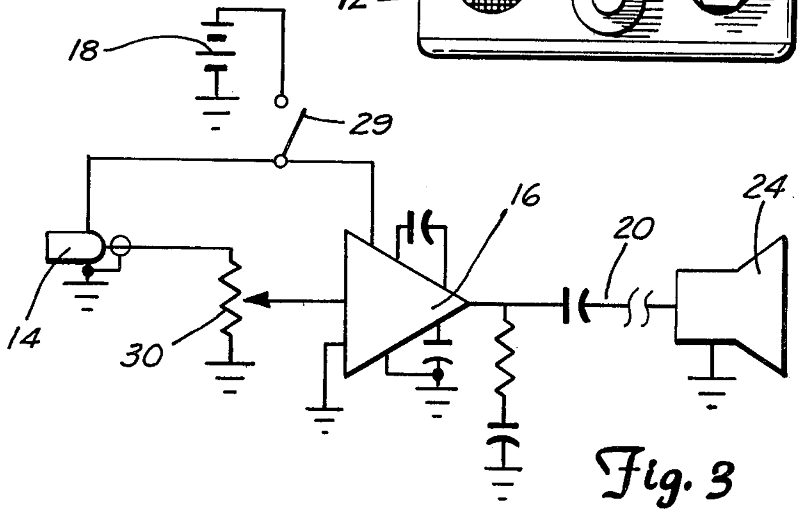
FIG. 3 is an electrical schematic of the circuitry of the present invention.

Referring now to the drawings there is illustrated in FIG. 1 a preferred embodiment of a portable communication apparatus embodying the principles of the present invention, generally referred to by the reference numberal 10. The present invention includes a pocket-sized rectangular housing 12 which contains a microphone 14, an amplifier 16 and associated circuitry as illustrated in FIG. 3. In addition, the housing 12 includes a power source 18 which, in the preferred embodiment shown, is a nine-volt direct current battery. Housing 12 is interconnected by an elongated electrical connector 20 to an earphone 22 adapted to be placed over a person's ear and containing circuitry 24 for receiving and converting electrical energy into sound waves.

Housing 12 and earphone 22 are adapted to be carried on the body of a first person who has normal hearing, e.g. in a coat or shirt pocket. When the first person wishes to talk to a second person having impaired hearing, the earphone 22 is connected by the electrical connector 20 to the housing 12 and then placed over the second person's ear. The first person can then speak into the microphone 14 which converts the sound into electrical current. The amplifier 16 amplifies the signal which is transmitted to the earphone 22. The receiving circuitry 24 of the earphone 22 converts the electrical current into sound waves. Consequently, the second person is able to hear the first person even during personal conversation.

More particularly, the rectangular shaped housing 12 includes top and bottom walls, front and back walls and side walls which define an enclosed cavity containing the associated microphone 14 and amplifier 16 circuitry. As illustrated in FIG. 1, the back wall is readily removable from the housing 12 by the use of screws 13 so as to enable access to the circuitry and power source 18. It will be appreciated other suitable methods might be utilized to enable ready access to the power source. The housing 12 defines a sound inlet 26 in the top wall, the sound inlet 26 admitting sound waves into the housing 12. It will be appreciated that the sound inlet 26 might take on several different embodiments, such as a single aperature covered by a membrane which is transparent to sound, a plurality of small openings in the housing wall, etc. The microphone 14 is positioned adjacent the inlet 26 such that when the housing 12 is positioned in a shirt or jacket pocket of the first person, the microphone 14 readily detects any speech or sound made by the person carrying the housing 12.

The positioning of the sound inlet 26 in the top portion of the housing 12 assures that the first person's voice is directed generally in the direction of the microphone 14. Additionally, if necessary, the first person need only tilt his/her head slightly to speak directly into the microphone such that even the softest speech will be heard by the second person. Furthermore, the positioning of the microphone inlet 26 in the top portion assures that the inlet 26 will not be obstructed by a persons pocket, etc. so as to prevent the detection of the first person's voice by the microphone.

Additionally, as illustrated in FIG. 1, the present invention includes a control knob 28 positioned on the top wall of the housing 12 which functions as an on/off switch 29 and as a volume control 30 for regulating the amount of sound application, see FIG. 3.

In the embodiment shown in FIG. 1, the connector 20 is attached to the housing 12 by a conventional releasable connection apparatus 32 located on the top wall of the housing 12. In the embodiment shown, the connector 20 has a male portion 31 of the connection apparatus 32 attached thereto while a female portion 33 is fixedly secured to the housing 12. Consequently, the earphone 22 and the connector 20 are releasably attached to the housing 12 and can be readily detached therefrom. Therefore, the earphone 22 and the connector 20 can be carried separately from the housing 12. Additionally, as illustrated in FIG. 1, the earphone includes a pivotable adaptor 35 for interconnecting the connector 20 to the earphone 22.

The earphone 22 of the present invention has an oblong U-shaped configuration adapted to fit over one's ear. In the embodiment shown in FIG. 1, the earphone 22 has a front wall 21 and a flexible edge wall 23 extending along the sides and top thereof. The flexible edge wall 23 is adapted for making contact with the side of the second person's head so as to enclose the ear within the cavity defined by the earphone 22, thereby shielding the ear from external sound other than the first person's voice being transmitted from the housing 12. The second person who has impaired hearing holds the earphone 22 over his/her ear when communications are carried out between the two parties. It will be appreciated, that the earphone 22 might take on other configurations, e.g. a small headset. However, it is not necessary that the earphone undergo extensive miniaturization.

Figure 4:
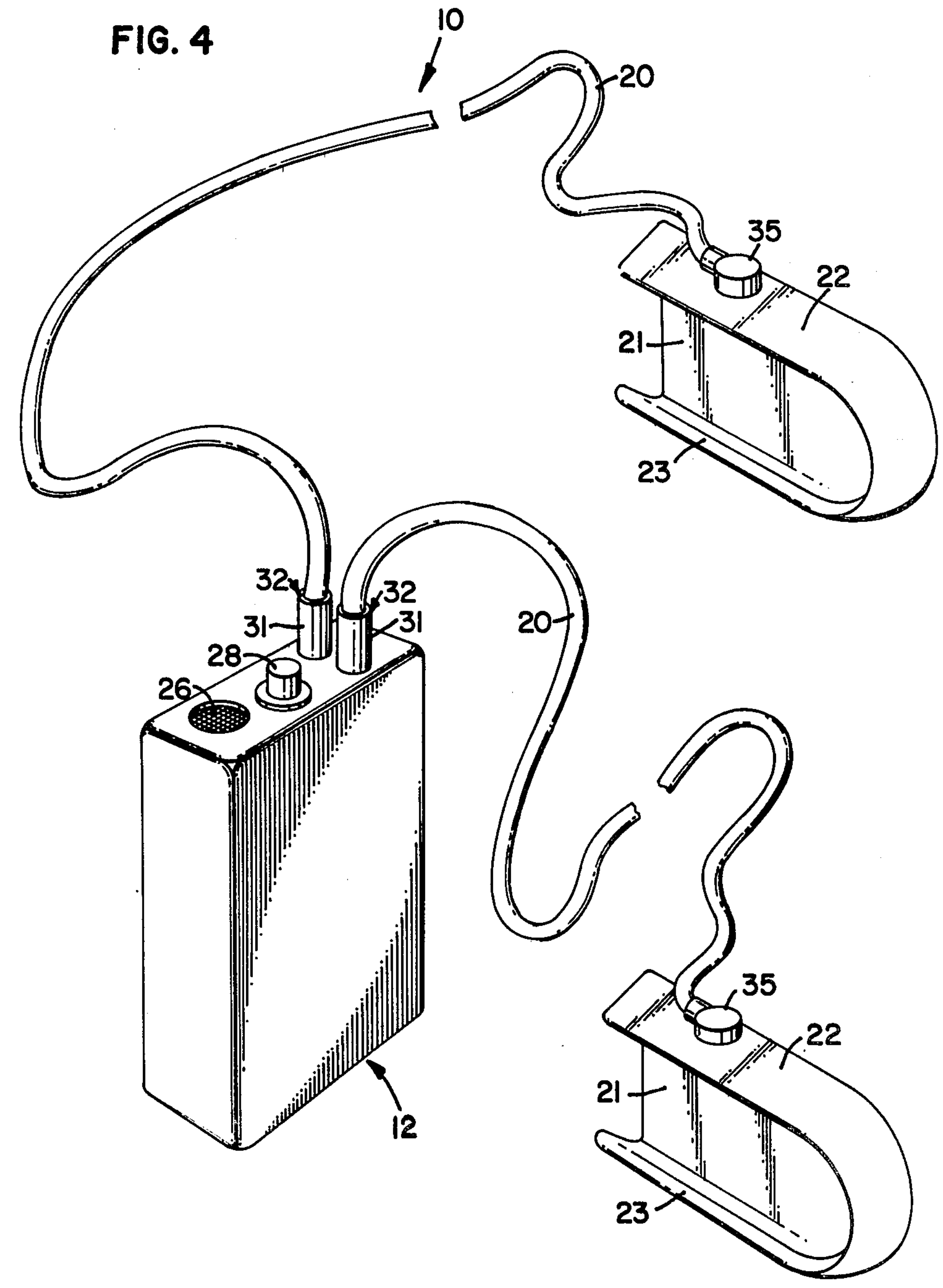
FIG. 4 is a view in perspective of yet another embodiment of the present invention.

Illustrated in FIG. 4 is yet another embodiment of the present invention. In this embodiment, the housing 12 is interconnected by two elongated electrical connectors 20 to two ear phones 22 adapted to be placed over a person's ear and each containing circuitry for receiving and converting electrical energy into sound waves. Accordingly, the embodiment illustrated in FIG. 4 enables a first person of normal hearing to communicate simultaneously with two hearing impaired people. It will be appreciated, that additional ear phones 22 might be interconnected to the housing 12 by suitable connectors 20.

The present invention thus provides a portable communication apparatus which is easy to use and economical to make. Furthermore, the present invention provides an apparatus which a person of normal hearing can carry on his/her person for use in talking to a person of impaired hearing. The present invention is economical as it need not undergo the extent of miniaturization found in devices worn by those people hard of hearing wherein it is desirable to conceal the apparatus for asthetic purposes. The present invention need only be pocket-sized, thereby enabling relatively cheap electronic parts to be utilized. Furthermore, the location of the sound inlet 26, the control knob 28 and the adapter 32 on the top portion of the housing 12 provides for ready access to the invention and enables the parties to carry on a conversation while the housing 12 is conveniently carried in the pocket of the first party.

The present invention provides an inexpensive communication device which can be carried by those of normal hearing who might have occasion to converse with people having impaired hearing, e.g., medical doctor in treating elderly patients.

It is to be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appendant claims are expressed.

What is claimed is:

1. A portable communication apparatus for communication between a first person of normal hearing ability and a second person whose hearing is impaired, said apparatus comprising:

(a) a first rectangular housing enclosing a microphone and an amplifier, said first housing having a size adaptable for carrying in a coat pocket of said first person, said housing having a top and bottom portion;

(b) said first housing defining a sound inlet portion in said top portion, said microphone being positioned adjacent said sound inlet portion, whereby said first person is able to speak into said microphone through said inlet portion;

(c) said first housing further including a DC battery power source for providing power for said microphone and amplifier, said microphone and amplifier being electrically interconnected so as to detect sound and amplify the same;

(d) said first housing including a switch for manually switching said communication apparatus on and off, said switch further being adapted for regulating the amount of amplification by said communication apparatus;

(e) a second housing separate and distinct from said first housing, said second housing being constructed and arranged to fit over the ear of said second person, said second housing having a U-shaped configuration and being necessarily configured for carrying on the body of said first person, said U-shaped second housing having a side wall and flexible edge walls extending perpendicular to the side wall and extending along the sides and top of said sidewall, the edge walls and side wall defining a cavity for placement of the ear, said second housing having means for receiving electrical signals from said amplifier, and for converting said electrical signals into sound waves;

(f) an electrical connector electrically connecting said receiving means in said second housing with said amplifier in said first housing, whereby the voice of said first person is amplified and transmitted to said means in the second housing, thereby enabling the second person to hear the first person, said second housing including a pivotal adaptor for interconnecting said electrical connector thereto; and (g) said first housing including adapter plug means for enabling said electrical connector to be readily connected and disconnected from said first housing.

2. A portable communication apparatus for communication between a first person of normal hearing ability and persons whose hearing is impaired, said apparatus comprising:

(a) a first rectangular housing enclosing a microphone and an amplifier, said first housing having a size adaptable for carrying in a coat pocket of said first person, said housing having a top and bottom portion;

(b) said first housing defining a sound inlet portion in said top portion, said microphone being positioned adjacent said sound inlet portion, whereby said first person is able to speak into said microphone through said inlet portion;

(c) said first housing further including a power DC battery power source for providing power for said microphone and amplifier, said microphone and amplifier being electrically interconnected so as to detect sound and amplify the same;

(d) said first housing including a switch for manually switching said communication apparatus on and off, said switch further being adapted for regulating the amount of amplification by said communication apparatus;

(e) second and third housings separate and distinct from said first housing, said second and third housings being constructed and arranged to fit over a person's ear, said second and third housings having a U-shaped configuration and being necessarily configured for carrying on the body of said first person, said U-shaped second and third housings having a side wall and flexible edge walls extending perpendicular to the side wall and extending along the sides and top of said side wall, the edge walls and side wall defining a cavity for placement of the ear, said second and third housings having means for receiving electrical signals from said amplifier, and for converting said electrical signals into sound waves;

(f) an electrical connector electrically connecting said receiving means in said second and third housings with said amplifier in said first housing, whereby the voice of said first person is amplified and transmitted to said receiving means in said second and third housings, thereby enabling two hearing impaired persons to simultaneously hear the first person, said second and third housings each including a pivotal adaptor for interconnecting said electrical connector thereto; and (g) said first housing including an adaptor plug means for enabling said electrical connector to be readily connected and disconnected from said first housing.

* * * * *

UNITED STATES PATENT AND TRADEMARK OFFICE
CERTIFICATE OF CORRECTION

PATENT NO. : 4,472,603

DATED : September 18, 1984

INVENTOR(S) : Arnold M. Berg

It is certified that error appears in the above-identified patent and that said Letters Patent is hereby corrected as shown below:

Col. 1, line 29-30, delete "mocrophone" and insert --microphone--.

Col. 3, line 12, delete "numberal" and insert --numeral--.

Col. 3, line 51, delete "aperature" and insert --aperture--.

Col. 3, line 66, delete "persons" and insert --person's--.

Signed and Sealed this

*Twenty-sixth* Day of *February 1985*

[SEAL]

*Attest:*

DONALD J. QUIGG

*Attesting Officer* *Acting Commissioner of Patents and Trademarks*